(12) United States Patent
Tokuyama

(10) Patent No.: US 9,092,746 B2
(45) Date of Patent: Jul. 28, 2015

(54) WORKFLOW PROCESSING PROGRAM, INFORMATION PROCESSING DEVICE AND WORKFLOW PROCESSING METHOD

(76) Inventor: Masaaki Tokuyama, Tokyo (JP)

( * ) Notice: Subject to any disclaimer, the term of this patent is extended or adjusted under 35 U.S.C. 154(b) by 298 days.

(21) Appl. No.: 13/381,275

(22) PCT Filed: Jun. 29, 2010

(86) PCT No.: PCT/JP2010/061078
§ 371 (c)(1),
(2), (4) Date: Mar. 19, 2012

(87) PCT Pub. No.: WO2011/001989
PCT Pub. Date: Jan. 6, 2011

(65) Prior Publication Data
US 2012/0166635 A1    Jun. 28, 2012

(30) Foreign Application Priority Data
Jun. 29, 2009    (JP) ................................ 2009-154378

(51) Int. Cl.
*G06F 15/173*    (2006.01)
*G06Q 10/06*    (2012.01)
*G06Q 10/10*    (2012.01)

(52) U.S. Cl.
CPC .............. *G06Q 10/06* (2013.01); *G06Q 10/109* (2013.01)

(58) Field of Classification Search
None
See application file for complete search history.

(56) References Cited

U.S. PATENT DOCUMENTS

| | | | |
|---|---|---|---|
| 2003/0097361 A1* | 5/2003 | Huang et al. ..................... | 707/10 |
| 2004/0243677 A1 | 12/2004 | Curbow et al. | |
| 2008/0204595 A1* | 8/2008 | Rathod et al. .................. | 348/465 |
| 2008/0250334 A1* | 10/2008 | Price ............................. | 715/753 |

(Continued)

FOREIGN PATENT DOCUMENTS

| | | |
|---|---|---|
| JP | 11-259568 A | 9/1999 |
| JP | 2001-034661 | 2/2001 |

(Continued)

OTHER PUBLICATIONS

Extended European Search Report mailed Jul. 30, 2014 in related European application No. 10794158.5 (6 pgs.).

(Continued)

*Primary Examiner* — Wing F Chan
*Assistant Examiner* — Padma Mundur
(74) *Attorney, Agent, or Firm* — Foley & Lardner LLP

(57) ABSTRACT

An information processing device, a workflow processing method, and a workflow processing program are provided. A hook section hooks the fact that an information communication function has communicated textual information. When the hook section hooks communication of textual information, a keyword extraction section reads the textual information that has been communicated, and extracts a keyword or keywords stored in a keyword storage section from the textual information that has been read. From the keyword or keywords extracted by the keyword extraction section, a commitment creation section creates new commitment information representing a commitment that is newly registered by a commitment management function, or revised commitment information representing revision of a commitment that has already been registered. A commitment updating section compares the commitments managed by the commitment management function with the commitment information that has been compiled, and inputs the comparison result to the commitment management function.

10 Claims, 19 Drawing Sheets

(56) References Cited

U.S. PATENT DOCUMENTS

2010/0178909 A1* 7/2010 Kim et al. .................. 455/418
2010/0318398 A1* 12/2010 Brun et al. ................... 705/9

FOREIGN PATENT DOCUMENTS

| JP | 2006-018556 | 1/2006 |
| JP | 2006-113956 A | 4/2006 |
| JP | 2006-139384 | 6/2006 |
| JP | 2007-058660 | 3/2007 |
| JP | 2007-079880 | 3/2007 |
| JP | 2008-77250 A | 4/2008 |
| JP | 2008-176691 A | 7/2008 |
| JP | 2008-210268 A | 9/2008 |
| JP | 2009-93503 A | 4/2009 |

OTHER PUBLICATIONS

Japanese Office Action issued in JP Appln. No. 2013-220679 with English translation; dated Aug. 12, 2014; 7 pages.

Mizuno, Takashi, "The 56th (H10 the first term) Conference of the Japanese Society for Artificial Intelligence Ronbun-shu (3) Database to Media Network Bunsho Kouzou no Kinou Gakushu ni Motozuku Kouzou Kijyutu no Jido Seisei, (The 56th (H10 the first term) Conference of the Japanese Society for Artificial Intelligence) Kouen Ronbunshu", Japan, The Japanese Society for Artificial Intelligence, Mar. 17, 1998: pp. 3-69-3-70.

Nasukawa, Tetsuya, "The 11th Annual Conference of the Japanese Society for Artificial Intelligence 1997 Ronbunshu Bun-myaku wo Riyo shita Keyword Goi Kettei (The 11th Annual Conference of the Japanese Society for Artificial Intelligence 1997)", Japan, The Japanese Society for Artificial Intelligence, Jun. 24, 1997: pp. 348-349.

* cited by examiner

FIG. 5

KEYWORD DICTIONARY X

| REPLY KEYWORDS DICTIONARY | REVISION KEYWORDS DICTIONARY | EXPENSE REQUEST KEYWORDS |
|---|---|---|
| RE: *, REPLY ··· | CHANGE, EXTEND, MOVE FORWORD, ··· | * EXPENSE, PAYMENT,* EXPENSE, PAYMENT, ··· |
| APPOINTMENT KEYWORD DICTIONARY | SETTLEMENT KEYWORD DICTIONARY | TO-DO LIST KEYWORDS |
| APPOINTMENT *, INTEND TO *, PLAN TO *, *?, ··· | OKAY, SET, OK, ··· | EXPERIMENT, CREATE, EDIT, REVISE, TELEPHONE, CONTACT, TASK, PREPARATION, CONTACT, ··· |
| TOPIC KEYWORD DICTIONARY | DATE AND TIME KEYWORD DICTIONARY | SCHEDULING KEYWORDS |
| MEETING *, MEET *, * MEETING, * CONFERENCE, ··· | * YEAR, * MONTH, * DAY, * O'CLOCK, * MINUTE ··· | ARRANGEMENT, MEETING, BUSINESS TRIP, OUTING, ABSENCE, VISIT, APPOINTMENT, ··· |
| LOCATION KEYWORD DICTIONARY | PEOPLE'S NAMES KEYWORD DICTIONARY | EXPENDITURE KEYWORDS |
| "C:¥MAIL¥CHIMEI.TXT", "C:¥MAIL¥EKIMEI.TXT", BIG CONFERENCE ROOM, SMALL CONFERENCE ROOM, ··· | "C:¥MAIL¥ADDRESS.TXT", "C:¥MAIL¥ZIN-MEI.TXT", K DIVISION HEAD, L SECTION HEAD, MR(S). M, PRESIDENT N, ··· | YEN, ¥, DOLLAR, $, EURO, WON, ··· |
| COMMENTS KEYWORDS | QUOTATION KEYWORDS | REFERENCE NUMBER KEYWORDS |
| * DEVICE, * FACTORY, * PLANT, *OFFICE,··· | >>, >, | NO., ID NO., ··· |

FIG. 6

EMAIL A

| |
|---|
| TO: DIVISION HEAD K, SECTION HEAD L, M<br>CC: PRESIDENT N<br>FROM: Y<br>TIME SENT: 6/17/2009, 14:10 |
| SUBJECT: QUALITY CONTROL MEETING |
| DIVISION HEAD K, SECTION HEAD L, M---THANK YOU FOR ALL YOUR HARD WORK. THIS IS Y IN THE DEVELOPMENT SECTION. WE WILL HOLD A QUALITY CONTROL MEETING FOR THE PROMISE DEVICE IN THE BIG CONFERENCE ROOM ON JUNE 22, 2009 (MONDAY) STARTING AT 14:30. |

FIG. 7

NEW COMMITMENT INFORMATION A

| |
|---|
| TOPIC: QUALITY CONTROL MEETING |
| DATE AND TIME: MONDAY, JUNE 22, 2009 |
| LOCATION: BIG CONFERENCE ROOM |
| PEOPLE: DIVISION HEAD K, SECTION HEAD L, M, Y |
| COMMENTS: PROMISE DEVICE |
| FLAG: SCHEDULE @TEMPORARY |

FIG. 8

COMMITMENT A

| |
|---|
| SCHEDULE A @TEMPORARY |
| TOPIC: QUALITY CONTROL MEETING |
| DATE AND TIME: MONDAY, JUNE 22, 2009 |
| LOCATION: BIG CONFERENCE ROOM |
| PEOPLE: DIVISION HEAD K, SECTION HEAD L, M, Y |
| COMMENTS: PROMISE DEVICE |

FIG. 9

EMAIL B

| CC: DIVISION HEAD K, SECTION HEAD L, M<br>FROM: PRESIDENT N<br>TIME SENT: 6/18/2009, 14:20 |
|---|
| SUBJECT: RE: QUALITY CONTROL MEETING |
| Y,<br>THANKS FOR YOUR HELP. I WOULD LIKE TO PARTICIPATE, SO COULD THIS BE CHANGED TO SATURDAY NEXT WEEK. I'LL LET YOU SET THE TIME.<br><br>>> WE WILL HOLD A QUALITY CONTROL MEETING FOR THE PROMISE DEVICE IN THE<br>>> BIG CONFERENCE ROOM ON JUNE 22, 2009 (MONDAY) STARTING AT 14:30. |

FIG. 10

EMAIL C

| TO: Y<br>CC: SECTION HEAD L, M, PRESIDENT N<br>FROM: DIVISION HEAD K<br>TIME SENT: 6/18/2009, 15:20 |
|---|
| SUBJECT: RE: QUALITY CONTROL MEETING |
| ALL,<br>THANKS FOR YOUR EFFORTS. K IS AVAILABLE FROM 14:00 ON SATURDAY NEXT WEEK.<br><br>-----ORIGINAL MESSAGE-----<br>FROM: PRESIDENT N<br>TIME SENT: 6/18/2009, 14:20<br>TO: Y<br>CC: DIVISION HEAD K, SECTION HEAD L, M<br>SUBJECT: RE: QUALITY CONTROL MEETING<br>>>Y,<br>>>THANKS FOR YOUR HELP. I WOULD LIKE TO PARTICIPATE, SO COULD THIS BE CHANGED TO<br>>>SATURDAY NEXT WEEK. I'LL LET YOU SET THE TIME. |

FIG. 11

EMAIL D

| TO: Y<br>CC:<br>FROM: SECTION HEAD L<br>TIME SENT: 6/24/2009, 7:20 |
|---|
| SUBJECT: (NONE) |
| THE 27TH IS OKAY. |

FIG. 12

REVISED COMMITMENT INFORMATION B

| REPLY: RE: QUALITY CONTROL MEETING |
|---|
| REVISED DATE AND TIME: SATURDAY, JUNE 27 |
| REVISED PERSON: PRESIDENT N |
| QUOTED TOPIC: QUALITY CONTROL MEETING |
| QUOTED DATE AND TIME: MONDAY, JUNE 22, 2009 |
| QUOTED LOCATION: BIG CONFERENCE ROOM |
| QUOTED COMMENTS: PROMISE DEVICE |
| FLAG: SCHEDULE |

FIG. 13

COMMITMENT B

| SCHEDULE @TEMPORARY |
|---|
| TOPIC: QUALITY CONTROL MEETING |
| DATE AND TIME: SATURDAY, JUNE 27, 2009 |
| LOCATION: BIG CONFERENCE ROOM |
| PEOPLE: DIVISION HEAD K, SECTION HEAD L, M, Y, PRESIDENT N |
| COMMENTS: PROMISE DEVICE |

FIG. 14

REVISED COMMITMENT INFORMATION C

| |
|---|
| REPLY: RE: QUALITY CONTROL MEETING |
| REVISED DATE AND TIME: SATURDAY, JUNE 27, 14:00 |
| REVISED PERSON: K |
| PEOPLE: Y, DIVISION HEAD K |
| QUOTED PERSON: Y |
| QUOTED DATE AND TIME: SATURDAY, JUNE 27, 2009 |

FIG. 15

COMMITMENT C

| |
|---|
| SCHEDULE @TEMPORARY |
| TOPIC: QUALITY CONTROL MEETING |
| DATE AND TIME: SATURDAY, JUNE 27, 2009, 14:00 |
| LOCATION: BIG CONFERENCE ROOM |
| PEOPLE: DIVISION HEAD K, SECTION HEAD L, M, Y, PRESIDENT N |
| COMMENTS: PROMISE DEVICE |

FIG. 16

NEW COMMITMENT INFORMATION D

| |
|---|
| DATE AND TIME: 27TH |
| PEOPLE: SECTION HEAD L, Y |
| SETTLEMENT: OKAY |

FIG. 17

COMMITMENT D

| SCHEDULE |
|---|
| TOPIC: QUALITY CONTROL MEETING |
| DATE AND TIME: SATURDAY, JUNE 27, 2009, 14:00 |
| LOCATION: BIG CONFERENCE ROOM |
| PEOPLE: DIVISION HEAD K, SECTION HEAD L, C, Y, PRESIDENT N |
| COMMENTS: PROMISE DEVICE |

FIG. 18

TRAVEL EXPENSE INVOICE
No. 20090622003

REQUESTOR
6/22/09
Y
TECHNOLOGY SECTION

| | | | | | | | |
|---|---|---|---|---|---|---|---|
| TRANSPORTATION EXPENSES | 6/20/09 | ¥14,470 | DEP. | TOKYO | ARR. | SANNOMIYA | COMMENT: TRAIN |
| | 6/20/09 | ¥1,050 | DEP. | SANNOMIYA | ARR. | KYOTO | COMMENT: TRAIN |
| | 6/20/09 | ¥210 | DEP. | KYOTO | ARR. | SHIJO | COMMENT: TRAIN |
| | 6/20/09 | ¥1,120 | DEP. | SHIJO | ARR. | KYOTO | COMMENT: TAXI |
| | 6/21/09 | ¥13,320 | DEP. | KYOTO | ARR. | TOKYO | COMMENT: TRAIN |
| LODGING EXPENSES | 6/20/09 | ¥5,000 | A HOTEL HORIKAWA | | | | |

| TOTAL: | ¥35,170 |
|---|---|

FIG. 19

TRAVEL EXPENSE INVOICE @TEMPORARY

No. 20090622003

| DATE SUBMITTED | 6/22/09 |
|---|---|
| SUBMITTER | Y |
| DEPARTMENT | TECHNOLOGY SECTION |

| | DATE | COST | DEPARTURE | ARRIVAL | COMMENTS |
|---|---|---|---|---|---|
| TRANSPORTATION EXPENSES | 6/20/09 | ¥14,470 | TOKYO | SANNOMIYA | TRAIN |
| | 6/20/09 | ¥1,050 | SANNOMIYA | KYOTO | TRAIN |
| | 6/20/09 | ¥210 | KYOTO | SHIJO | TRAIN |
| | 6/20/09 | ¥1,120 | SHIJO | KYOTO | TAXI |
| | 6/21/09 | ¥13,320 | KYOTO | TOKYO | TRAIN |

| | DATE | COST | LODGING FACILITY | COMMENTS |
|---|---|---|---|---|
| LODGING EXPENSES | 6/20/09 | ¥5,000 | A HOTEL HORIKAWA | |

| TOTAL COST | ¥35,170 |
|---|---|

FIG. 21

TRAVEL EXPENSE INVOICE
No. 20090622003

| DATE SUBMITTED | 6/22/09 |
|---|---|
| SUBMITTER | Y |
| DEPARTMENT | TECHNOLOGY SECTION |
| APPROVED BY | L |

| | DATE | COST | DEPARTURE | ARRIVAL | COMMENTS |
|---|---|---|---|---|---|
| TRANSPORTATION EXPENSES | 6/20/09 | ¥14,470 | TOKYO | SANNOMIYA | TRAIN |
| | 6/20/09 | ¥1,050 | SANNOMIYA | KYOTO | TRAIN |
| | 6/20/09 | ¥210 | KYOTO | SHIJO | TRAIN |
| | 6/20/09 | ¥1,120 | SHIJO | KYOTO | TAXI |
| | 6/21/09 | ¥13,320 | KYOTO | TOKYO | TRAIN |

| | DATE | COST | LODGING FACILITY | COMMENTS |
|---|---|---|---|---|
| LODGING EXPENSES | 6/20/09 | ¥5,000 | A HOTEL HORIKAWA | |

| TOTAL COST | ¥35,170 |
|---|---|

FIG. 22A

ADVERTISING EMAIL 1

TO: ALL
FROM: YMD
TIME SENT: 6/15/2010, 14:10

SUBJECT: GUIDE TO START OF DOWNLOAD SALES

ALL,
DOWNLOAD SALES OF PROMISE EMAIL IS STARTING AT 14:00 ON JUNE 2, 2010

FIG. 22B

ADVERTISING EMAIL 2

TO: ALL
FROM: TERADAYA
TIME SENT: 5/20/2010, 14:10

SUBJECT: GUIDE TO LARGE BARGAIN SALE

EVERYONE,
FROM JUNE 10 TO JUNE 13, 2010, ALL OF OUR STORES WILL BE HAVING A LARGE BARGAIN SALE--20% OFF ALL MERCHANDISE. SO COME ON DOWN TO THE STORE, EVERYONE!

FIG. 23

JUNE

| SUN | MON | TUE | WED | THURS | FRI | SAT |
|---|---|---|---|---|---|---|
| | | 1<br>TOKYO TRIP | 2<br>TOKYO TRIP | 3 | 4 | 5 |
| 6<br>14:00, CONFERENCE ROOM, QUALITY CONTROL MEETING | 7 | 8 | 9 | 10<br>TERADAYA 20% OFF BARGAIN SALE | 11<br>TERADAYA 20% OFF BARGAIN SALE | 12<br>TERADAYA 20% OFF BARGAIN SALE |
| 13<br>TERADAYA 20% OFF BARGAIN SALE | 14 | 15 | 16 | 17 | 18 | 19 |
| 20 | 21 | 22<br>14:00, PROMISE EMAIL DOWNLOAD SALE STARTS | 23 | 24 | 25 | 26 |
| 27 | 28<br>10:00 NEW PRODUCT CONFERENCE | 29 | 30 | | | |

FIG. 24A

A NEW SCHEDULE IS REGISTERED WITH THE FOLLOWING CONTENT.
IF THIS IS OKAY, PRESS THE SET BUTTON;
IF THIS NEEDS EDITING, PRESS THE EDIT BUTTON.
IF THIS IS CANCELLED, PRESS THE CANCEL BUTTON.

| SCHEDULE A @TEMPORARY |
| --- |
| TOPIC: QUALITY CONTROL MEETING |
| DATE AND TIME: MONDAY, JUNE 6, 2009 |
| LOCATION: BIG CONFERENCE ROOM |
| PEOPLE: DIVISION HEAD K, SECTION HEAD L, M, Y |
| COMMENTS: PROMISE DEVICE |

[ SET ]    [ EDIT ]    [ CANCEL ]

FIG. 24B

THE SCHEDULE IS REVISED WITH THE FOLLOWING CONTENT.
IF THIS IS OKAY, PRESS THE SET BUTTON;
IF THIS NEEDS EDITING, PRESS THE EDIT BUTTON.
IF THIS IS CANCELLED, PRESS THE CANCEL BUTTON.

BEFORE CHANGE

| SCHEDULE A @TEMPORARY |
| --- |
| TOPIC: QUALITY CONTROL MEETING |
| DATE AND TIME: MONDAY, JUNE 5, 2009, 14:00 |
| LOCATION: BIG CONFERENCE ROOM |
| PEOPLE: DIVISION HEAD K, SECTION HEAD L, M, Y |
| COMMENTS: PROMISE DEVICE |

AFTER CHANGE

| SCHEDULE A @TEMPORARY |
| --- |
| TOPIC: QUALITY CONTROL MEETING |
| *DATE AND TIME: TUESDAY, JUNE 6, 2012, 14:00* |
| LOCATION: BIG CONFERENCE ROOM |
| *PEOPLE: DIVISION HEAD K, SECTION HEAD L, MY, KJ, PQ* |
| COMMENTS: PROMISE DEVICE |

[ SET ]    [ EDIT ]    [ CANCEL ]

WORKFLOW PROCESSING PROGRAM, INFORMATION PROCESSING DEVICE AND WORKFLOW PROCESSING METHOD

TECHNICAL FIELD

The present invention relates to a workflow processing program, an information processing device and a workflow processing method.

BACKGROUND ART

Documents are exchanged in various types of workflow, such as adjusting schedules, processing expense requests, processing attendance reports and/or the like.

In addition, information processing devices of recent years such as cell phones and personal computers are provided with functions for sending and receiving textual information that is digitized documents, and these functions for sending and receiving textual information are often used in workflow.

There are various methods for these functions of sending and receiving textual information, including not just functions for sending and receiving documents using the Internet but also functions for sending and receiving files using a P2P (Peer-to-Peer) approach without going through a server.

Thus, textual information is communicated through a variety of methods in various types of workflow.

However, in much workflow conducted from communicating textual information, understanding and processing the textual information received or sent is left to the individual user, creating a variety of problems.

For example, when a document file inquiring about participation in a meeting is received, it is necessary to read and comprehend the received document, compare the comprehended content to a schedule that has already been created, and reply affirmatively or negatively about participating.

In addition, for example when an email requesting expenses is received, the responsible party must comprehend the contents of the expenditure from the email and process such.

In this manner, in workflow accomplished via textual information there have also been cases in which time was wasted in understanding the textual information and creating and updating rules manually, and human-caused mistakes arose.

Hence, in Patent Literature 1, an information processing device is disclosed that includes a means for managing email, a means for managing a schedule, a means for analyzing email, a means for determining whether or not email analysis results are reflected in the schedule, and a means for reflecting the contents of email in the schedule in accordance with the determination results.

This information processing device can create a schedule automatically by analyzing email contents.

In addition, when a scheduling conflict arises, it is possible to correct the schedule by selecting one of the conflicting schedules.

PRIOR ART LITERATURE

Patent Literatures

Patent Literature 1: Unexamined Japanese Patent Application Kokai Publication No. H11-259568

DISCLOSURE OF INVENTION

Problems to be Solved by the Invention

However, the information processing device according to Patent Literature 1 cannot adjust the schedule correctly when email is received correcting schedule contents.

For example, when textual information is sent having the content: "because the concert on Saturday, June 20, starts at 6:30 pm, let's meet at Kyoto Station at 6:15 pm", a schedule item is automatically entered as follows:

Schedule Example 1: "Date: June 20; Time: 6:15 pm; Location: Kyoto Station; Comments: Concert starts at 6:30 pm."

When textual information having the content: "Because the concert starts at 6 pm, let's meet at 15 minutes to 6 pm" is received after Schedule Example 1 has been entered, a schedule item is created as follows:

Schedule Example 2: "Date: June 20; Time: 5:45 pm; Comments: Concert starts at 6 pm."

When Schedule Example 2 is created, the contents of Schedule Example 1 and Schedule Example 2 are in conflict, so Schedule Example 2 is chosen out of Schedule Example 1 and Schedule Example 2.

However, no location is included in Schedule Example 2, so it is impossible to correctly process the workflow.

Similarly, in the past it has been difficult to specify commitments, appointments, contact items and/or the like by processing textual information.

In consideration of the foregoing problems, it is an object of the present invention to provide a workflow processing program, information processing device and workflow processing method for processing workflow between sending and receiving textual information and recording commitments based on the textual information.

In addition, it is another object of the present invention to provide an information processing device and information processing method that can accurately specify commitments, appointments and contact items and/or the like from textual information.

Problem Resolution Means

In order to achieve the above objects, a workflow processing program according to a first aspect of the present invention causes an information processing device provided with a communication function for sending and receiving textual information and a commitment storage function for storing commitments to execute:

a keyword storage function for storing multiple keywords;

a communication capture function for capturing the fact that the communication function has sent or received textual information, and sending the fact that said textual information was sent or received;

a keyword extraction function that receives the fact that the textual information was sent or received, and upon receiving the fact that the textual information was sent or received extracts and outputs the keywords from the sent or received textual information on the basis of the multiple keywords stored by the keyword storage function;

a commitment information creation function that receives the keywords output by the keyword extraction function, and creates and outputs new commitment information that causes a new commitment to be stored in the commitment storage function or revised commitment information that causes the commitment stored by the commitment storage function to be updated, on the basis of the keywords received; and a commitment updating function that receives the new commitment information and causes a new commitment to be stored in the commitment storage function on the basis of the new commitment information received, or receives the revised commitment information and revises the commitment stored by the commitment storage function on the basis of the revised commitment information received.

In order to achieve the above objects, an information processing device according to a second aspect of the present invention comprises:

a communication means for sending and receiving textual information;

a commitment storage means for storing commitments;

a keyword storage means for storing multiple keywords;

a communication capturing means for capturing the fact that the communication means sent or received textual information, and sending the fact that the textual information was sent or received;

a keyword extraction means that receives the fact that the textual information was sent or received, and upon receiving the fact that the textual information was sent or received extracts and outputs the keywords from the sent or received textual information on the basis of the multiple keywords stored by the keyword storage function;

a commitment information creation means that receives the keywords output by the keyword extracting means, and creates and outputs new commitment information that causes a new commitment to be stored in the commitment storage means or revised commitment information that causes the commitment stored by the commitment storage means to be updated, on the basis of the keywords received; and a commitment updating means that receives the new commitment information and causes a new commitment to be stored by the commitment storage means on the basis of the new commitment information received, or receives the revised commitment information and revises the commitment stored by the commitment storage on the basis of the revised commitment information received.

In order to achieve the above objects, a workflow processing method according to a third aspect of the present invention is a workflow processing method in an information processing device comprising a communication function for sending and receiving textual information and a commitment storage function for storing and revising commitments, being a method for processing workflow between the communication function and the commitment storage function and comprising:

a step for capturing the fact that the communication function has communicated textual information;

a step for reading the sent or received textual information when the fact that the communication function has communicated textual information is captured;

a step for extracting specified keywords from the textual information read; and a step for updating the commitments stored by the commitment storage function on the basis of the extracted keywords.

Efficacy of the Invention

With the present invention, it is possible to process with good accuracy workflow that creates appointments from communicated textual information.

BRIEF DESCRIPTION OF DRAWINGS

FIG. 5 is a drawing showing a keyword dictionary in which keywords stored by the information processing device of FIG. 1 are recorded;

FIG. 6 is a drawing showing an example of email sent by the information processing device of FIG. 1;

FIG. 7 is a drawing showing commitment information the information processing device of FIG. 1 creates from the email of FIG. 6;

FIG. 8 is a schedule registered in the information processing device of FIG. 1 on the basis of the commitment information of FIG. 7;

FIG. 9 is a drawing showing one example of email received by the information processing device of FIG. 1;

FIG. 10 is a drawing showing one example of email received by the information processing device of FIG. 1;

FIG. 11 is a drawing showing one example of email received by the information processing device of FIG. 1;

FIG. 12 is a drawing showing commitment information the information processing device of FIG. 1 creates from the email of FIG. 9;

FIG. 13 is a drawing showing a schedule registered in the information processing device of FIG. 1 on the basis of the commitment information of FIG. 12;

FIG. 14 is a drawing showing commitment information the information processing device of FIG. 1 creates from the email of FIG. 10;

FIG. 15 is a drawing showing a schedule registered in the information processing device of FIG. 1 on the basis of the commitment information of FIG. 14;

FIG. 16 is a drawing showing commitment information the information processing device of FIG. 1 creates from the email of FIG. 11;

FIG. 17 is a drawing showing a schedule registered in the information processing device of FIG. 1 on the basis of the commitment information of FIG. 16;

FIG. 18 is a drawing showing an example of a spreadsheet software filed communicated by the information processing device of FIG. 1;

FIG. 19 is a drawing showing a commitment recorded on the basis of the file of FIG. 18;

FIG. 21 is a drawing showing the commitment of FIG. 19 updated on the basis of the file of FIG. 20;

FIGS. 22A and 22B show one example of advertising email;

FIG. 23 shows a display example (calendar) of a commitment summary;

FIGS. 24A and 24B shown one example of a confirmation screen;

BEST MODE FOR CARRYING OUT THE INVENTION

Figure 1:
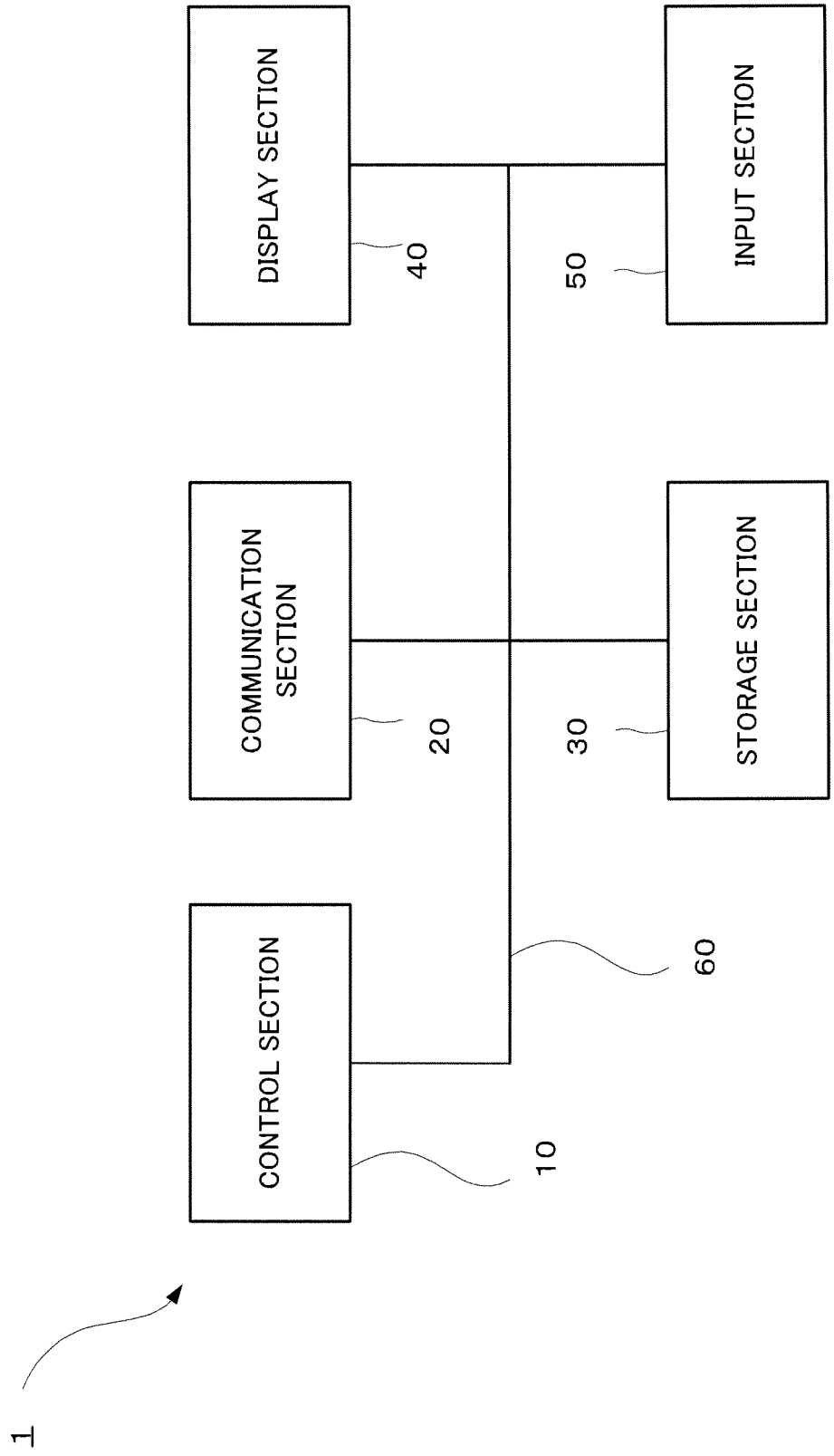
FIG. 1 is a block diagram showing the structure of an information processing device according to the present invention.

Below, an information processing device according to an embodiment of the present invention will be described with reference to the drawings.

An exemplary composition of an information processing device 1 according to an embodiment of the present invention is described with reference to FIG. 1.

The information processing device 1 is, for example, a cell phone provided with a control section 10, a communication section 20, a storage section 30, a display section 40 and an input section 50. In addition, these sections are mutually connected to each other by a system bus 60. The system bus 60 is a transfer route for transferring commands and data.

The control section 10 includes a CPU (Central Processing Section), RAM (Random Access Memory) that becomes a work area, and/or the like, and controls each of the sections of the information processing device 1 by executing prescribed operating programs.

The communication section 20 includes a NIC (Network Interface Card), a router, a modem and/or the like, and accomplishes communications with nearby base stations and other information processing devices having communication functions.

Textual information is sent and received by the operation of this communication section 20.

The storage section 30 includes non-volatile memory and/or the like.

The storage section 30 stores programs executed by the control section 10 and also various commitments such as schedules, to do lists, various types of requests accomplished in the past and/or the like.

The display section 40 includes an liquid crystal panel and/or the like.

The display section 40 displays information input by the control section 10.

The input section 50 includes a touch panel and/or the like.

When information is input into the input section 50, the control section 10 controls the communication section 20, the storage section 30 and the display section 40 in response to the input information.

The composition of the information processing device 1 was explained above.

Next, the various functions that the information processing device 1 logically executes will be described.

Figure 2:
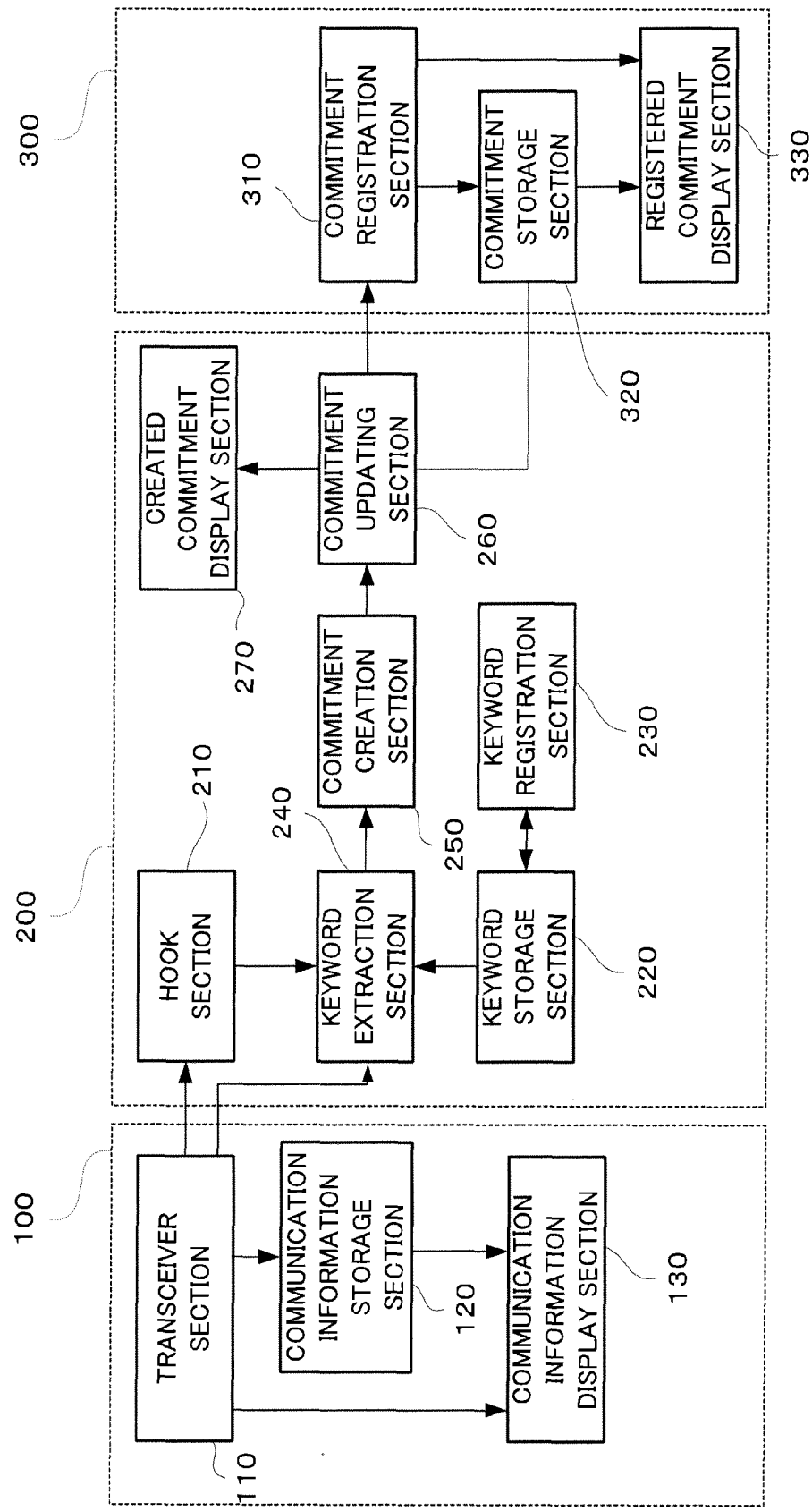
FIG. 2 is a block diagram showing the functions of the information processing device of FIG. 1.

The control section 10 controls the communication section 20, the storage section 30, the display section 40 and the input section 50 by reading and executing operating programs stored in advance in the storage section 30, via the system bus 60, and logically executes an information communication function 100, a workflow function 200 and a commitment management function 300 shown in FIG. 2.

The information communication function 100 includes a transceiver section 110 that sends and receives textual information, a communication information storage section 120 and a communication information display section 130 for displaying textual information, and sends and receives textual information via communication circuits.

The information communication function 100 is not limited to one, as multiple may be present.

The transceiver section 110 sends and receives textual information such as email, documents and/or the like via communications circuits.

The communication information storage section 120 stores textual information the information communication function 100 sends and receives from the transceiver section 110.

The communications information display section 130 displays textual information sent or received from the transceiver section 110, and textual information stored in the communication information storage section 120.

The workflow function 200 is provided with a hook section 210, a keyword storage section 220, a keyword registration section 230, a keyword extraction section 240, a commitment creation section 250, a commitment updating section 260 and a created commitment display section 270.

The workflow function 200 processes flow between the information communication function 100 and the commitment management function 300.

To describe this in detail, the workflow function 200 captures that the information communication function 100 has sent or received textual information, extracts keywords from the captured sent or received textual information and stores a commitment based on the extracted keywords in the commitment management function 300.

The hook section 210 hooks the transceiver section 110 of the information communication function 100 and detects communication of textual information. Upon detecting the communication of textual information, the hook section 210 sends the fact that the transceiver section 110 has communicated textual information to the keyword extraction section 240.

The keyword storage section 220 stores keywords extracted by the keyword extraction section 240 from the textual information sent or received by the information communication function 100.

The keyword registration section 230 registers the keywords in the keyword registration section 220. When the keywords are input into the keyword registration section 230, the keyword registration section 230 registers the input keywords in the keyword storage section 220. The keywords input into the keyword registration section 230 are classified by category, and those keywords are registered in the keyword storage section 220 as keywords for those categories.

When the fact that the information communication function 100 has communicated textual information from the hook section 210 is received, the keyword extraction section 240 reads the communicated textual information, temporarily stores such in a work area, extracts the keywords from the textual information by referencing the keywords stored in the keyword storage section 220, and outputs the result to the commitment creation section 250.

The commitment creation section 250 receives keywords output from the keyword extraction section 240 and creates commitment information from the received keywords.

The commitment updating section 260 compares the commitment information created by the commitment creation section 250 to commitments created in the past, and sends the fact that a commitment has been registered to the commitment management function 300 on the basis of the comparison results.

The created commitment display section 270 displays commitments created by the commitment creation section 250.

The commitment management function 300 is provided with a commitment registration section 310, a commitment storage section 320 and a commitment display section 330, and manages commitments.

There may be one or multiple commitment management functions 300.

When there are multiple commitment management functions 300, the commitment management function 300 used may be switched in accordance with the type of commitment, for example.

The commitment registration section 310 receives registration of commitment information and inputs the received commitment information into the commitment storage section 320.

The commitment storage section newly stores the commitment or updates a stored commitment on the basis of the input commitment information.

The commitment display section 330 displays commitment information newly input into the commitment registration section 310 and commitment information already registered in the commitment storage section 320.

The information processing device 1 executes the above-described logical functions, and the workflow function 200 executes the commitment creation process described next.

In the commitment creation process, the workflow function 200 captures the fact that the information communication function 100 has sent and received textual information, reads keywords from the textual information sent and received, creates commitment information newly registering commitments from keywords that were read or commitment information revising commitments created in the past, and inputs the created commitment information into the commitment management function 300.

Through this, the information processing device 1 can execute a process that creates commitments from textual information sent and received, which is workflow between the sending and receiving process accomplished by the information communication function 100 and the commitment recording process accomplished by the commitment management function 300.

In addition, the commitment updating section 260 compares the commitment information for newly recording a commitment with commitments already recorded, and if these are similar, revises the commitment already recorded on the basis of the commitment information newly recording the commitment.

In addition, the commitment updating section 260 compares the commitment information for revising the commitment and the commitment information already registered, and if these are similar, revises the commitment already registered on the basis of the commitment information revising the commitment.

Through this, the information processing device 1 can process the workflow with good accuracy.

In addition, the keywords registered in the keyword storage section 220 are classified by category, and the keywords extracted from the textual information are stored in regions determined by the commitment information for each category.

For example, the keywords are classified as replies, modifications, dates, times, locations and/or the like.

Because the keywords are classified in each category, the 5W1H (who, what, when, where, why and how) of the commitment become clear.

Through this, the information processing device 1 can accurately and quickly detect commitments to be revised.

In addition, the categories classifying the keywords registered in the keyword storage section further include categories for classifying types of commitments.

For example, the categories for classifying commitments includes categories for scheduling, requests, to do lists and/or the like.

When the keyword extraction section 240 extracts a keyword classifying commitments from textual information hooked by the hook section 210, the commitment information created by the commitment creation section 250 from that textual information is classified by type of keyword extracted and input into the commitment management function 300 by the commitment updating section 260.

Through this, it is possible for the information processing device 1 to classify and store various types of commitments.

In addition, the categories classifying the keywords have an exclusive relationship.

For example, suppose two types of keywords, namely a keyword for requesting expenses and a keyword for a to do list are extracted from one item of textual information. In this case, the commitment is registered as an expense request and is not recorded in the to do list.

Through this, it is possible to classify commitments more accurately.

In addition, the categories classifying the keywords include categories for keywords indicating quotations.

When a keyword indicating a quotation is extracted from the textual information, the keyword extraction section 240 classifies whether the extracted other keyword is a keyword in the original commitment or a keyword of a new commitment, on the basis of the extracted keyword indicating a quotation.

To explain concretely in order to facilitate understanding, for example if an email saying "change our plans from 10 am to 2 pm" is received, from the keywords "from  to ", "10 am" is classified as the keyword of the original commitment and "2 pm" is classified as the keyword of a new commitment.

In addition, for example if the content is ">>tomorrow, our plans for 10 am . . . ", the phrase "tomorrow, our plans for 10 am", which are written after ">>", are keywords extracted from a quotation and consequently are classified as a keyword of an original commitment.

For example, when the terms "quotation" and "original message" are extracted, keywords extracted after this keyword are classified as keywords of the original commitment.

The commitment creation section 250 creates revised commitment information storing keywords classified as keywords or the original commitment as keywords included in the commitment to be revised, and the commitment updating section 260 compares the keywords classified as keywords of the original commitment and commitments registered in the commitment management function 300, and specifies and updates the revision target on the basis of the comparison results.

Through this, it is possible to more accurately and quickly detect commitments to be revised.

In addition, the categories classifying the keywords include categories for keywords indicating that a commitment has been settled. Categories indicating settlement include keywords indicating completion of a job, keywords indicating settlement of a schedule, keywords indicating receipt of a request, and/or the like.

When a commitment is newly registered in the commitment management function 300, the commitment updating section 260 registers that commitment in the commitment management function 300 as an unsettled commitment. In addition, the commitment updating section 260 inputs into the commitment management function 300 the fact that the target unsettled commitment is updated to a settled commitment, on the basis of the revised commitment information with contents settling the unsettled commitment.

For example, when keywords related to plans for a new meeting are extracted, the commitment updating section 260 registers this in the commitment management function 300 as unsettled plans for a meeting.

Following this, when keywords indicating that plans for this meeting have been settled, the commitment updating section 260 inputs the fact that plans for this meeting have been settled into the commitment storage section 300.

Through this, the information processing device 1 can classify unsettled commitments and settled commitments.

Above, the commitment creation process was simply explained.

Next, the commitment creation process will be described in detail with reference to the flowchart in FIG. 3.

In the commitment creation process, the hook section 210 of the workflow function 200 hooks the fact that the transceiver section 110 of the information communication function 100 has sent or received textual information through communication (step S101).

When the hook section 210 hooks the communication of the transceiver section 110, the keyword extraction section 240 reads the textual information communicated this time by accessing the communication of the transceiver section 110 (step S102). When the textual information is read, the keyword extraction section 240 references keywords stored in the keyword storage section 220, extracts keywords from the textual information that was read (step S103) and outputs this to the commitment creation section 250. When keywords for revising or completing and settling a commitment are included in the extracted keywords (step S104; Yes), the workflow function 200 accomplishes the below-described commitment information updating process (step S200).

When keywords for revising or completing and settling a commitment are not included in the input keywords (step S104: No), the commitment creation section 250 creates new commitment information for newly registering a commitment (step S105), and outputs this to the commitment updating section 260.

When the commitment creation section 250 outputs new commitment information, the commitment updating section 260 compares the input new commitment information with commitments stored in the commitment storage section 320 (step S106), and determines whether or not the content is similar on the basis of keywords such as topics, names and times stored in the commitment information (step S107).

When the content is similar (step S107; Yes), the commitment updating section 260 clarifies what is to be updated by appending information showing the commitment whose contents are similar to the keywords (step S108), and the workflow function 200 accomplishes a commitment information updating process (step S200).

When the content is not similar (step S107; No), the commitment updating section 260 sets an @temporary flag on the new commitment information (step S109).

When an @temporary flag is set on the new commitment information, the commitment updating section 260 inputs the new commitment information on which the @temporary flag was set into the commitment registration section 310 (step S110).

The commitment registration section 310 registers the input new commitment information in the commitment storage section 320.

When keywords for revising or settling a commitment are not included in the keywords extracted by the keyword extraction section 240 (step S104; Yes), the workflow function 200 executes the commitment information updating process shown in the flowchart of FIG. 4.

In the commitment information updating process, the commitment creation section 250 creates revised commitment information on the basis of keywords input from the keyword extraction section 240 (step S201).

When revised commitment information is created, the commitment creation section 250 determines whether or not the target of revision is clear by determining whether or not the created revised commitment information includes a reference number or link for the target commitment to be revised (step S202).

When the target of revision of the revised commitment information that was created is not clear (step S202; No), the commitment updating section 260 compares the commitment information stored in the commitment storage section 320 and the revised commitment information (step S203).

When there are no commitments with similar content (step S204; No), the commitment updating section 260 sets an @unapplied flag on the revised commitment information as revised commitment information that has not been applied (step S205), and inputs the revised commitment information on which the @unapplied flag has been set into the commitment registration section 310 (step S206).

When a commitment with similar content is registered in the commitment storage section 320 (step 204; Yes), the commitment updating section 260) clarifies the revision target of the revised commitment information by designating the commitment with similar content as the revision target (step S207).

When the target to be revised is clearly revised (step S207) or when the revision target of the revised commitment information is clear (step S202; Yes), the commitment updating section 260 determines whether or not the revised commitment information has caused the commitment that is the revision target to be completed and settled (step S208).

If this is not revised commitment information that causes the commitment to be completed and settled (step S208; No), the commitment updating section 260 inputs the revised commitment information into the commitment registration section 310 (step S206).

If this is revised commitment information that causes the commitment to be settled (step S208; Yes), the commitment updating section 260 revises the revised commitment information so as to erase the @temporary flag from the target commitment (step S209) and inputs the revised commitment information that was revised into the commitment registration section 310 (step S206).

Above, the commitment creation process was described with reference to the flowcharts shown in FIGS. 3 and 4.

Next, the commitment creation process will be described by citing a concrete example of textual information communicated by the information communication function 100 in order to facilitate understanding.

The explanation will assume that a program that causes the workflow function 200 to be executed is installed on the information processing device 1 that is a cell phone provided with the information communication function 100 that communicates email and the commitment management function 300 that manages schedules.

The workflow function 200 hooks the communication function of the cell phone, reads the communicated email, creates commitment information from the email read and registers the schedule in a scheduler on the basis of the created commitment information.

The keyword storage section 220 of the workflow function 200 for example stores the keyword dictionary X shown in FIG. 5.

Keywords are stored in the keyword dictionary X for each category such as replies, revisions, settlement, appointments, topics, date and time, location, name, quotation, expense requests, to do lists, scheduling and/or the like. In addition, the file "c:¥mail¥address.txt" is designated in the category for name. The workflow function 200 accomplishes the commitment creation process by referring to keywords containing email addresses and names stored in the designated files, in addition to terms registered for each category.

In addition, keywords extracted from the column where quotation keywords were extracted are stored in the commitment information so as to be discernible as keywords extracted from quotations.

For example, supposed Y sent email A shown in FIG. 6 to section head K, section head L and M with a Cc to president N. The contents notify the recipients that a quality control meeting on the promise device will be held in the main conference room on Monday, Jun. 22, 2009.

When the information communication function 100 of Y's cell phone sends email A, the hook section 210 captures the fact that the transceiver section 110 has communicated email A (step S101 in FIG. 3), and the fact that the transceiver section 110 has communicated email A is sent to the keyword extraction section 240. When the fact that the transceiver section 110 has communicated email A is received, the keyword extraction section 240 reads the email A from the work area of the transceiver section 110 that communicated such (step S102 in FIG. 3).

Figure 3:
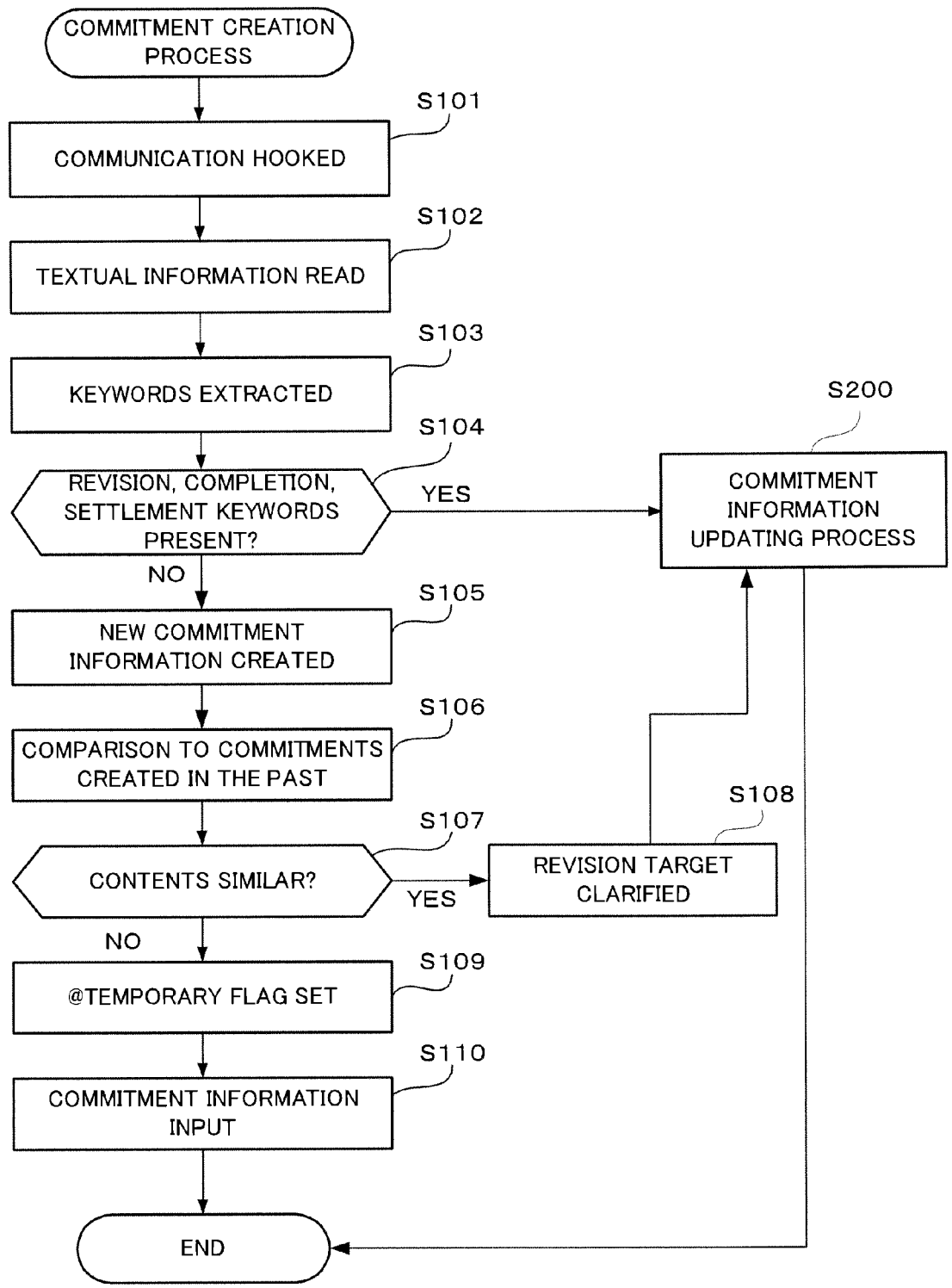
FIG. 3 is a flowchart showing the commitment creation process accomplished by the information processing device of FIG. 1.

When the email A is read, the keyword extraction section 240 extracts keywords in each category stored in the keyword dictionary X from the email A that was read and outputs such to the commitment creation section 250 (step S103 in FIG. 3).

Because there are no keywords indicating a reply, revision or settlement in the input keywords (step S104 in FIG. 3; No), the commitment creation section 250 creates a new commitment information A from the extracted keywords in each category (step S105 in FIG. 3).

The new commitment information A is for example as shown in FIG. 7. Because the email contains "quality control meeting", which corresponds to the scheduling keyword "* meeting", quality control meeting is stored in the topics category of the new commitment information A. Similarly, the date and time, name and location keywords are stored.

In addition, because "meeting" is also a keyword for scheduling, a schedule flag is set in the new commitment information A.

When the new commitment information A is created, the commitment updating section 260 compares the new commitment information A and the schedule already created in the past and stored in the commitment management function 300 (step S106 in FIG. 3).

Because a schedule similar to the new commitment information A is not registered in the commitment management function 300 (No in step S107 of FIG. 3), the workflow function 200 sets the @temporary flag in the new commitment information A (step S109 in FIG. 3), and the new commitment information A is input into the commitment registration section 310 of the commitment management function 300 (step S110 in FIG. 3). The commitment management function 300 receives the new commitment information A and creates schedule A shown in FIG. 8.

The information stored in the new commitment information A is registered in the schedule A, indicating that a quality control meeting will be held from 14:30 on Monday, June 22.

When the email A is received, the schedule A is registered in the scheduler that is the commitment management function 300 as described above.

Next, suppose that after the email A is sent, email B, email C and email D are received, for example.

The email B has the contents shown in FIG. 9, and the email B is an email that includes the response keyword "Re: quality control meeting" and the revision keyword "change", including quoting email A.

The content of email B is a reply to email A directed by president N to Y saying president N can also participate in the meeting and requesting the time be changed to Saturday of next week.

Email C is an email whose contents are shown in FIG. 10, and is email whose contents include the reply keyword "Re: quality control meeting" and states that section head K is available starting at 14:00 on Saturday, June 27. In addition, the sent time and contents of email B are included in the quotation.

Email D is email sent from section head L to Y at 7:20 on Jun. 24, 2009, as shown in FIG. 11, and has no subject heading, stating only that "the $27^{th}$ is okay".

The hook section 210 of the workflow function 200 hooks the communication and the keyword extraction section 240 extracts keywords from the email B (step S103 in FIG. 3). Because a reply keyword is contained in the keywords extracted from the email B (Yes in step S104 in FIG. 3), the workflow function 200 accomplishes the commitment information updating process (step S200 in FIG. 3). The commitment creation section 250 creates revised commitment information B shown in FIG. 12 in the commitment information updating process (step S201 in FIG. 4).

In the revised commitment information B, "Re: quality conferment" is stored in the reply category, "Saturday June 27" is stored in the revised date and time category indicating the date and time after revision, and "president N" is stored in the revised person category indicating the addition of a person participating in the meeting.

In addition, keywords having the same contents as the new commitment information A are extracted as keywords extracted from the quotation.

Figure 4:
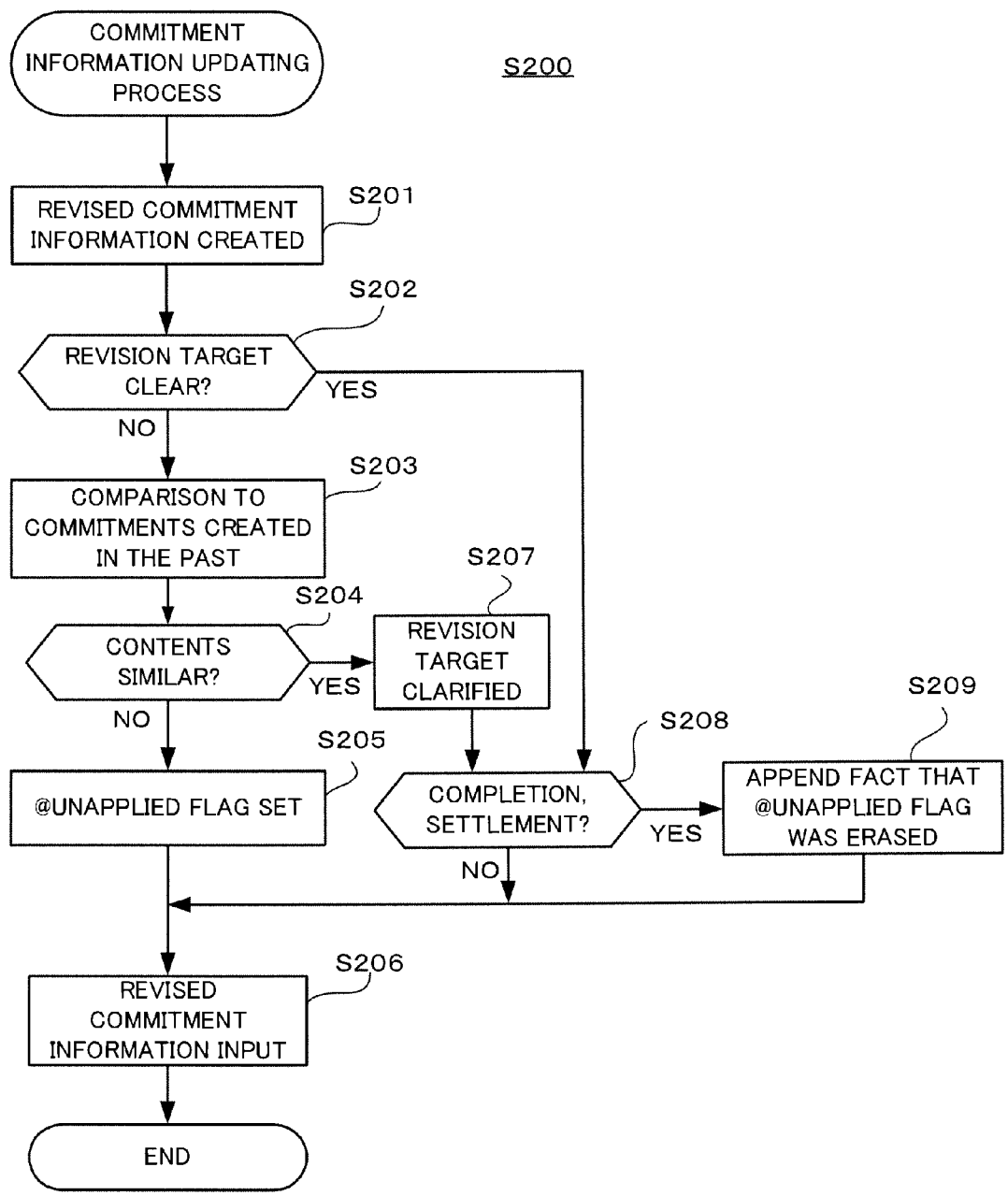
FIG. 4 is a flowchart showing the commitment information updating process that is part of the commitment creation process in FIG. 3.

Although the revision target is not clear in the revised commitment information B (No in step S202 in FIG. 4), through the keywords stored in the revised commitment information B the commitment updating section 260 detects schedule A is similar to revised commitment information B (Yes in step S204 in FIG. 4).

The commitment updating section 260 further stores the fact that the target of revision by the revised commitment information B is schedule A in the revised commitment information B (step S207 in FIG. 4), and inputs the revised commitment information B for revising the schedule A into the scheduler (step S206 in FIG. 4).

The scheduler revises the schedule A on the basis of the revised commitment information B and updates this to schedule B.

Schedule B has the contents shown in FIG. 13, and revises the date and time of schedule A to Saturday, Jun. 27, 2009, and adds president N to the people.

When after hooking reception of the email B the hook section 210 hooks reception of the email C, the workflow function 200 creates from the email C the revised commitment information C shown in FIG. 14.

In the revised commitment information C, "Re: quality control meeting" is stored in the reply category, "from 14:00 on Saturday June 27" is stored as a revised date and time, "Saturday June 27" created from keywords extracted from the quotation is stored as the date and time of the quotation, and Y is stored as the person of the quotation.

The commitment updating section 260 determines from the keywords "quality control meeting" and "Saturday June 27" that schedule B is similar to revised commitment information C (Yes in step S204 of FIG. 4), it is clear that the target of revision is the schedule B (step S207 in FIG. 4) and the fact that the revision target is schedule C is input into the scheduler (step S206 in FIG. 4).

The scheduler updates schedule B to schedule C on the basis of the revised commitment information C.

Schedule C has the contents shown in FIG. 15, and is schedule B with the date and time updated to "from 14:00 on Saturday June 27".

When after reception of email C communication of email D is hooked, the workflow function 200 updates schedule C on the basis of the contents of email D.

The keywords extracted from email D are only "section head L", "27$^{th}$" and "okay".

Because the settlement keyword "okay" is included in email D (step S104 in FIG. 3), the commitment creation section 250 creates revised commitment information D from the keywords input from the keyword extraction section 240 (step S201 in FIG. 4).

The revised commitment information D has the contents shown in FIG. 16 and stores "27$^{th}$" as the date, "section head L" and "Y" as people and "okay" as a keyword settling the schedule.

When the commitment creation section 250 creates the revised commitment information D, the commitment updating section 260 compares the new commitment information D and the commitments stored in the commitment management function 300 (step S203 in FIG. 4).

The commitment updating section 260 determines that the revised commitment information D is similar to the schedule C from the keywords "section head L" and "Saturday June 27" of schedule C and the recipient "Y" (Yes in step S204 in FIG. 4).

Having determined that the schedule C is similar to the revised commitment information D, the commitment updating section 260 clarifies that the schedule C is the target (step S207 in FIG. 4) and inputs the revised commitment information D into the scheduler (step S206 in FIG. 4). Because a settlement keyword is included in the revised commitment information D (Yes in step S208 in FIG. 4), the commitment updating section 260 erases the @temporary flag from the schedule C (step S209 in FIG. 4) and updates this to schedule D.

The schedule D has the contents shown in FIG. 17, and is the schedule C from which the @temporary flag has been erased. Through this, the schedule D is set.

The case of creating schedules from received emails was explained concretely above.

Next, an example of a file relating to a request for travel expenses and/or the like being exchange via P2P will be explained.

For example, suppose that Y transfers a spreadsheet software file E1 (FIG. 18) in which a request for travel expenses is noted from Y's personal computer in which the workflow function 200 is installed to the personal computer of section head L using LAN circuits.

The spreadsheet software file E1 contains the travel expense request as an expense request keyword, various place names contained in "chimei.txt" in the location keywords and various expenses.

The workflow function 200 on Y's personal computer system hooks the fact that an Ethernet (registered trademark) adapter output the spreadsheet software file E1 (step S101 in FIG. 3), accesses the work area of the Ethernet adapter, reads the spreadsheet software file E1 (step S102 in FIG. 3) and extracts keywords from the spreadsheet software file E1 that was read (step S103 in FIG. 3).

Because there are no revision keywords but there are expense request keywords in the extracted keywords (No in step S104 in FIG. 3), the workflow function 200 creates new commitment information E2 related to expense requests (step S105 in FIG. 3), compares this to past commitments (step S106 in FIG. 3), and because there are no similar commitments (No in step S107 in FIG. 3), sets an @temporary flag (step S108 in FIG. 3) and inputs this into the commitment management function 300 related to expense requests (step S109 in FIG. 3).

The commitment management function 300 related to expense requests stores a new commitment E3 (FIG. 19) from the input new commitment information E2.

Figure 20:
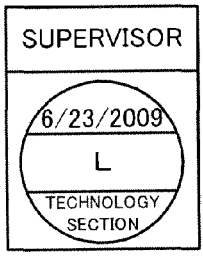
FIG. 20 is a drawing showing an example of a document file as a response to the file of FIG. 18.

Following this, when section head L sends to Y a document file F1 (FIG. 20) indicating that payment has been completed, the workflow function 200 of Y's personal computer extracts keywords from the document file F1 and inputs revised commitment information F2 indicating that the commitment E3 was completed into the commitment management function 300 on the basis of the extracted keywords.

Because "completed" is included in the extracted keywords, (Yes in step S103 in FIG. 3), the workflow function 200 accomplishes the commitment information updating process (step S200 in FIG. 3).

The keywords extracted from the document file F1 include "contact", which is a to-do list keyword, and "travel expenses", which is an expense request keyword.

The workflow function 200 gives the expense request keywords priority over the to-do list keywords and creates revised commitment information F2 revising the expense request (step S201 in FIG. 4).

Because "No" is included in the document file F1, the revision target is clear (Yes in step S202 in FIG. 4), and because the settlement keyword "completed" is included (Yes in step S208 in FIG. 4), erasing the @temporary flag is appended to the revised commitment information F2 (step S209 in FIG. 4), and the revised commitment information F2 is input into the commitment management function 300 for expense management (step S206 in FIG. 4).

The commitment management function 300 into which the revised commitment information F2 was input erases the @temporary flag from the commitment E3 and updates this to the commitment F3 (FIG. 21).

As explained above, with the present embodiment in an information processing device centered on a computer it is possible to process workflow creating commitments from textual information between a process of sending and receiving textual information and a process of registering commitments.

The present invention is not limited to the above-described embodiment, for various variations and applications are possible.

For example, in the present embodiment an @temporary flag was set in the commitment itself stored by the commitment management function 300. However, it would also be fine to set the @temporary flag in each keyword stored in the commitment.

For example, when the commitment is a schedule, the @temporary flag could be set in the keywords of each individual and schedule, the @temporary flag could be erased only from keywords for people whose schedule settlement was confirmed, and when the @temporary flag has been erased from the keywords of all people, the @temporary flag could be erased from the schedule.

To explain this by citing a concrete example in order to facilitate understanding, suppose for example that the information processing device sends an email regarding a scheduled "meeting" in which K, L and M will participate. From this email, a schedule composed of "meeting@temporary" is created, including "K@temporary", "L@temporary" and "M@temporary".

After the schedule is created, when K responds with an email confirming the schedule, "K@temporary" is updated to "K".

Similarly, when L and M respond with emails confirming the schedule, "L@temporary" is updated to "L" and "M@temporary" is updated to M.

The "meeting@temporary" schedule in which @temporary has been erased from the keyword for each person is then updated to "meeting" and the scheduled is settled.

As in the above case, it is possible for a user to more clearly confirm whether or not a commitment has been concluded and settled by a flag being set in the keywords.

In addition, in the above-described embodiment, whether the revision target was clear was determined by determining whether or not the revised commitment information created includes keywords such as reference numbers and links for the schedule to be revised.

However, whether or not the target of revision is clear, it is fine as long as there is information that can clearly specify the revision target, and the functions provided in the information communication function 100 may be used.

For example, many emailers have a function that, when an email is sent in reply to received email, links to the reply email the email to which this is a response. The target of revision may be determined using such a function.

In addition, with the above embodiment, when the created commitment information is compared with the already registered commitments, commitments were found to be similar by comparing keywords stored.

However, the method of determining whether or not such is similar is not limited to this kind of method.

For example, it would be fine to determine if schedules are similar based on the number of matching keywords, it would be fine to determine that schedules are similar by weighted summing of matching keywords, weighted for each keyword and category, it would be fine to determine whether or not similarity is present by doing vertical searches and horizontal searches for keywords from schedules in which such are already registered, it would be fine to do heuristic searching, other search methods and comparison methods would naturally be fine and naturally any combination of these approaches would be fine.

A similar statement could be made about extraction of keywords.

Extraction of keywords may be accomplished not just by simply extracting character codes the same as the keywords but also setting as keywords specified descriptive methods and sentence structures.

In addition, with the present embodiment, the workflow function 200 created commitments by classifying in types, such as schedules and expense requests, but this classification need not be done.

For example, registration in the commitment management function may be done without classification into a schedule or to-do list.

In addition, the classification of the created commitment may be limited.

For example, the schedule alone may be created, registration in the commitment management function 300 may be done and registration in the commitment management function 300 by creating the schedule and the to-do list may be done.

In addition, with the present embodiment, the information communication function 100, the workflow function 200 and the commitment management function 300 were explained as differing functions, but a function provided with two of these functions, or a function with all three of these functions would be fine.

If the information communication function 100 and the workflow function 200 are the same program, it is not necessary to have a system hook as described in the above embodiment, for it is preferable to have a local hook.

In general, an approach using a local hook offers greater stability than one with a system hook.

In addition, with the above embodiment, the explanation was for a program stored in advance on nonvolatile memory and/or the like. However, it would be fine for a program that causes the information processing device to operate in full or in part, or to execute the above-described process, to be stored and distributed on a computer-readable storage medium such as flexible disk, CD (Compact Disk), DVD (Digital Versatile Disk), MO (Magneto Optical disk) or the like, to install such on separate information processing devices, and to cause the above-described procedures to operate or the above-described steps to be executed.

In addition, the program may be stored on the disk device possessed by a server apparatus on the Internet, and for example for such to be downloaded to the information processing device by being overlaid on carrier waves.

In addition, with the above embodiment the explanation was for a commitment creation process functioning when a program that causes the workflow function 200 to execute is installed on a cell phone provided with the information communication function 100 and the commitment management function 300.

In addition, an example was explained in which files are moved using LAN circuits in personal computers on which the workflow function 200 has been installed.

However, the information processing device is not limited to cell phones and personal computers and may be a device having a communication function and a function for communicating textual information, such as a smartphone, a PHS (Personal Handy System) or an email exchange server.

However, when the information processing device does not possess a schedule function, it is necessary to install not just the workflow function 200 but also the commitment management function 300.

In addition, with the above embodiment the description was such that the textual information was email, spreadsheet software files and document files, but other types of files may be used as well as long as the textual information can contain information relating to a schedule.

For example, this may be a PDF (Portable Document Format) file, and naturally may be an image file created by scanning a document printed on paper.

In other words, the workflow function 200 is not limited by the type of file that is communicated.

In addition, with the above embodiment the explanation used meeting and appointment contacts, date and time adjustments and requests for expenses as examples of created schedules, but this can be used for diligent management and shift work management as well.

For example, the workflow function 200 may be installed on a shift management server.

The shift management server is provided with a shift management function for managing shift information and a communication function for email. In addition, in the keyword storage section 220 of the workflow function 200, "date and time" corresponding to the timetable of the shift, "employee identification information" such as the employee's email address and telephone number and/or the like are stored as keywords.

When employees send emails noting the desired date and time of their shift to the shift management server, the shift management server extracts the sender and the desired date and time from the received email and creates shift information from the extracted sender and desired date and time. The shift management server compares the shift information created and the shift information already registered and registers the shift if there is no overlap, and if there is overlap, replies to the sender that there is an overlap.

Through this, the user can automatically determine a shift by merely sending an email to the server without having to access a dedicated server.

With the above-described embodiment, an example was shown of processing a business email (text), but this invention can be applied to arbitrary systems processing arbitrary text.

For example, it would be fine to process advertising email and ad pages such as those shown in FIGS. 22A and 22B, and to incorporate into the workflow the date and time, location and content contained in the advertisement.

In addition, in the above example, the explanation centered on workflow, but this may be used to register a schedule in a schedule or calendar such as that shown in FIG. 23. In FIG. 23, the content of advertisements incorporated from FIGS. 22A and 22B are also registered. The contents of June 22 in the calendar (schedule) shown in FIG. 23 correspond to the advertisement in FIG. 22A, and the contents of June 10-13 correspond to the advertisement in FIG. 22B.

In addition, in the above embodiment an example was shown in which commitments are automatically registered and updated (revised), but it would also be fine to confirm registration permission and registration contents with the user prior to registration. In this case, for example the control section 10 displays a screen confirming registration contents such as those shown in FIGS. 24A and 24B prior to registering the commitment information.

When the user sees the display and clicks the confirmation button, the display contents are registered in the schedule. When the user clicks the edit button, the control section 10 displays a screen editing the commitment information, enabling editing. Following this, the revised contents are registered in the schedule.

In addition, when the cancel button is clicked, the control section 10 does not perform registration or updating.

With the above embodiment, the present invention was explained in an example in which the information processing device 1 acts in coordination with the workflow to accomplish schedule registration.

The present invention can be broadly applied to a system that extracts arbitrary information items from arbitrary text and supplies such to arbitrary application software.

Below, the operation of a system in such a case is explained.

The information processing device 1 of the present embodiment has a basic composition similar to the composition shown in FIG. 1.

Figure 25:
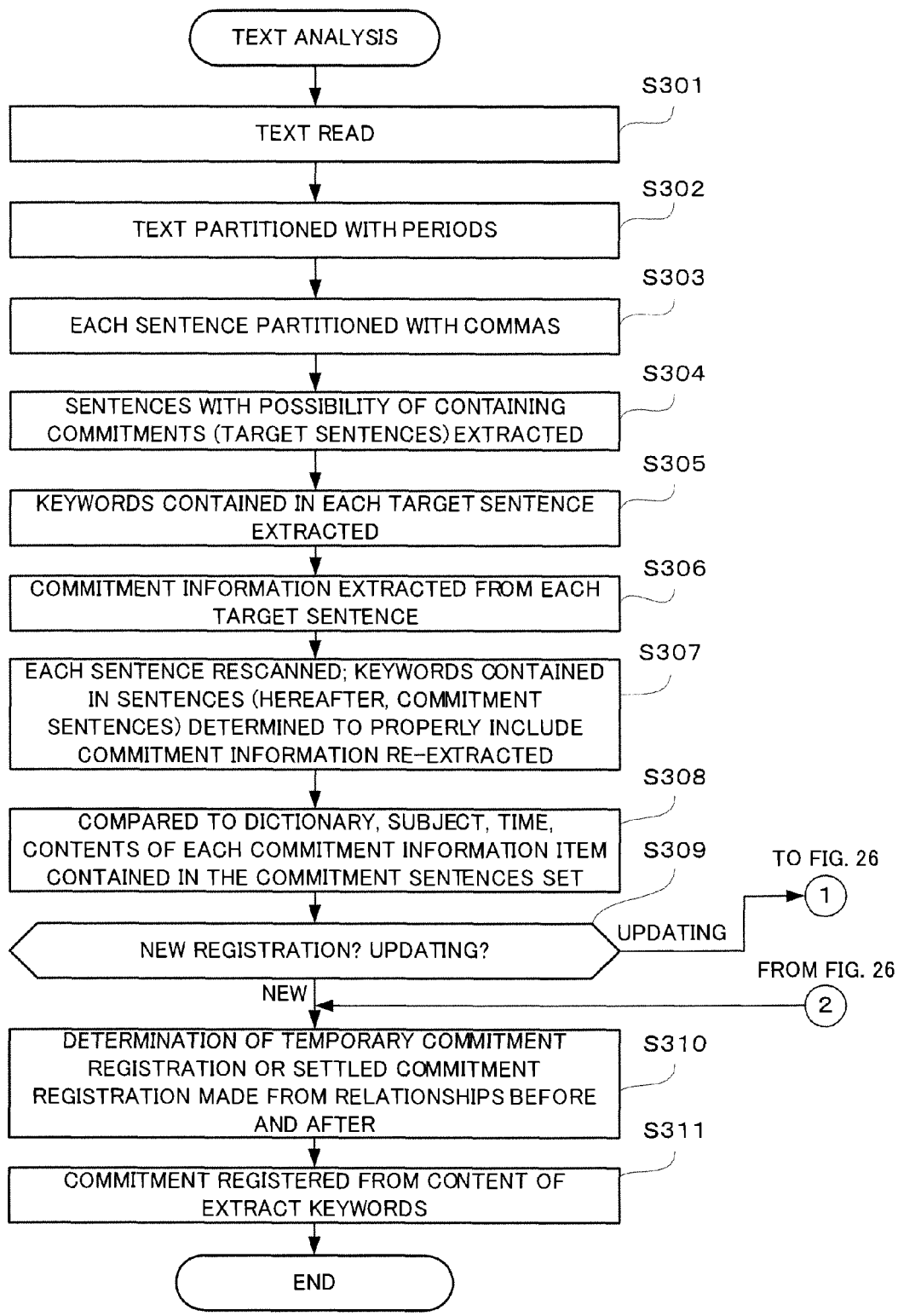
FIG. 25 is a flowchart of a text information analysis process accomplished by an information processing device.

When a communication section 20 acquires text (for example, sends or received text and reads such), the control section 10 of the information processing device 1 starts the text analysis process shown in FIG. 25, reads the text communicated this time and deploys this to the storage section 30 (step S301). When the text has already been deployed to the storage section, redeploying is not necessary.

The control section partitions the text deployed in the storage section 30 using periods, divides this into multiple sentences and appends an identifying number to each sentence (step S302).

The control section 10 partitions each sentence with commas (or colons, semicolons or the like) (step S303).

Next, the control section 10 extracts sentences with the possibility of containing commitments, appointments, schedules and/or the like (hereafter called target sentences) with reference to a dictionary (step S304). That is to say, the control section 10 extracts sentences containing keywords and removes sentences not containing keywords.

Next, the control section 10 compares this to the dictionary and extracts keywords from each target sentence (step S305).

Specifically, the control section 10 determines whether or not any of the keywords stored in the keyword storage section 220 correspond, in order from the character at the start of each sentence. When it is determined that the character array matches a keyword, the character array (keyword) and the position thereof (the sentence and position in the sentence) is specified.

The determination of whether a character array matches a keyword is accomplished as follows if the language is Japanese, for example. Keywords whose first characters match are extracted, and next from among those extracted keywords, the list is narrowed to keywords that match the first and second character of the sentence, and further narrowed to keywords matching the first, second and third characters, and so forth, repeatedly narrowing to extract keywords in each sentence. When multiple matching keywords are detected, one is specified based on context. When extraction of one character array has been completed, a similar process is executed for character arrays following the extracted character array. In this manner, keywords are successively extracted from each head. In addition, in the case of English, because terms are separated by spaces, character arrays delineated by spaces are compared to keywords, and a determination made as to whether or not each is a keyword.

Extracted keywords belonging to multiple categories are extracted. For extracted keywords belonging to multiple categories, a determination is made as to whether or not the category can be specified from position in the sentence or relationship to other words in the same sentence, and if possible the categories are narrowed. For example, when keywords registered in a people's name dictionary also belong to other categories, the keyword is specified as a person's name if immediately after that keyword is "ha" or "ga" (in the case of Japanese). Similarly, when a keyword registered in a location keyword dictionary belongs to other categories, the keyword is specified as a place name if immediately after that keyword is "de" or "ni oite" (in the case of Japanese). In addition, if ">>" or ">" is at the head of the display line, the keyword is specified as a quotation keyword. Rules are prepared in advance for each category describing in what cases a keyword is likely to belong to that category and when the probability of a keyword belonging to a given category is low, and these rules are stored in the storage section 30.

The control section 10 extracts commitment information, appointment information and the like contained in the target sentences from the type of extracted keywords, the position within the target sentence and keywords before and after (step S306)

Next, the control section 10 rescans the target sentences, and re-extracts keywords contained in sentences in which it has been determined that commitment information, appointment information and/or the like are correctly included (hereafter called commitment sentences) (step S307).

Next, the control section 10 makes a comparison to the dictionary and specifies the contents, date and time, and case name of each commitment information item contained in the commitment sentences (step S308).

Next, the control section 10 determines whether or not the specified commitment information is new or is an update to already existing commitment information (step S309).

For this determination, the control section 10 determines whether or not keywords revising or completing and settling commitments are included in the extracted keywords. When keywords revising, completing or settling commitments are included, this is determined to be an update. On the other hand, when keywords revising, completing or settling commitments are not included, this is determined to be a new commitment.

When the control section 10 determines that this is a new commitment (step S309; New), the control section 10 determines whether the registered commitment is a temporary registration or a settled registration from the contents of the text and the relationship to the text before and after (step S310), and registers this in the commitment storage section 320 so as to be associated with the commitment information.

Next, the control section 10 registers the commitment in the schedule with the contents of the extracted keywords (step S311), or supplies this to an application program.

Figure 26:
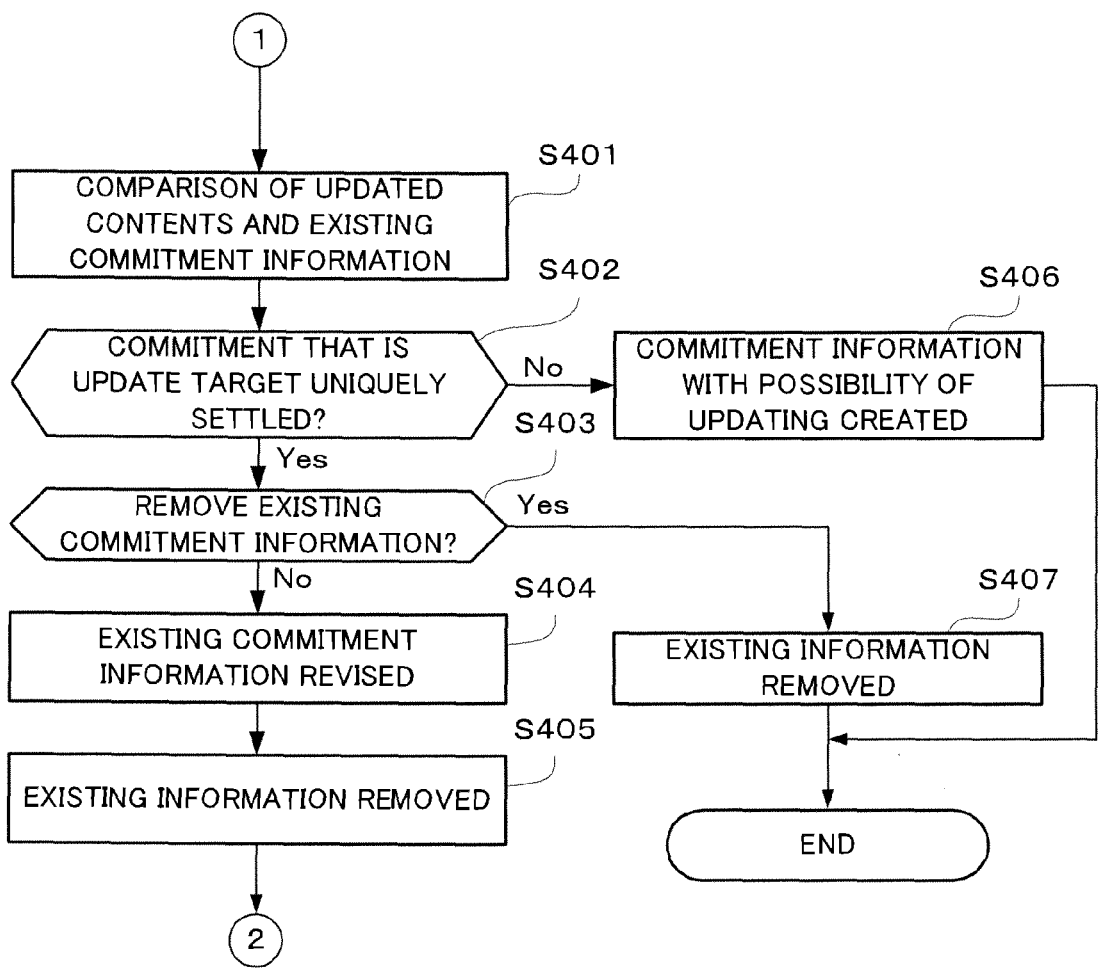
FIG. 26 is a flowchart of a text information analysis process accomplished by an information processing device.

On the other hand, when the determination is "update" in step S309, the flow moves to FIG. 26 and the control section 10 compares the created commitment information and the commitment stored in the commitment storage section 320 (step S401), and determines whether or not the commitment that is the update target is uniquely settled (step S402). For example, when the title of the text partially matches or multiple keywords in separate categories relating to people's names, time and location match, the determination is that this is uniquely settled.

When the determination is that this is uniquely settled (step S402; Yes), the control section 10 determines whether or not to remove the existing commitment information (step S403). For example, when the keywords "cancel", "postpone", "suspend" and/or the like are detected regarding the existing commitment, the determination is to remove.

When the determination is to remove existing commitment information (step S403; Yes), the existing commitment information is removed (step S407) and the process concludes. In this case, the control section 10, when removing the information registered in the commitment storage section 320 and also supplying the information to an outside application, creates and supplies the information for removing that commitment information.

When the determination is to not remove the existing commitment information (step S403; No), commitment information is created by revising the existing commitment information on the basis of this commitment information (step S404).

Next, the existing commitment information is removed as necessary (step S405).

Following this, the process moves to step S310 and the commitment information created in step S404 is registered.

In addition, when it is determined in step S402 that the commitment information that is the update target is not uniquely settled (step S402; No), multiple items of commitment information that could be updated are created (step S406) and the user is caused to select. Following this, after the appropriate registration process has been accomplished, the process concludes.

In this manner, the present invention can be broadly used in a system for extracting and registering the key points of arbitrary text.

Information extracted in this manner can be supplied to arbitrary application software. Even the application software can undertake various processes using the information stored in the storage section 30.

This application claims the benefit of Japanese Patent Application 2009-154378, filed Jun. 29, 2009, the entire disclosure of which is incorporated by reference herein.

INDUSTRIAL APPLICABILITY

The present invention can be broadly used in the text processing field.

EXPLANATION OF SYMBOLS 1 information processing device
100 information communication function
200 workflow function
210 hook section
220 keyword storage section
230 keyword registration section
240 keyword extraction section
250 commitment creation section
260 commitment updating section
300 commitment management function

The invention claimed is:

1. An information processing device comprising:
a memory, one or more processors coupled to said memory for executing:
a communication unit configured to transmit textual information;
a schedule storage unit configured to store schedule information;
a keyword storage unit configured to store multiple keywords that are classified into multiple categories;
a keyword extraction unit configured to extract keywords from the textual information transmitted by the communication unit on the basis of the keywords stored in the keyword storage unit, and specify one category corresponding the extracted keywords when extracting a keyword which was classified into a plurality of categories based on a position thereof and relationships to other words in the text information;
a schedule information creation unit configured to create new schedule information or revised schedule information which causes schedule information stored in the schedule storage unit to be updated, based on the keywords extracted by the keyword extraction unit and the categories of the extracted keywords; and
a schedule updating unit configured to store the new schedule information into the schedule storage unit, and update the schedule information stored in the schedule storage unit with the revised schedule information,
wherein the schedule information creation unit is configured to:
determine whether the extracted keywords include a keyword classified to a category for revising the schedule, indicating completion of a job, or settlement of existing schedule information, and create the new schedule information including date and content when determining there is no keyword classified to the category for revising the schedule, indicating completion of a job, or settlement of existing schedule information; and
create schedule information for updating the existing schedule information when determining there is a keyword classified to the category for revising the schedule, indicating completion of a job, or settlement of existing schedule information, and
wherein the schedule updating unit is configured to:
compare the new schedule information with the schedule information stored in the schedule storage unit to find a similar schedule information which is similar to the new schedule information, update the found similar schedule information with the new schedule information when finding the similar schedule information, and store the new schedule information in the schedule information storing unit when not finding the similar schedule information; and compare the schedule information for modifying and the schedule information stored in the schedule storage unit to find a similar schedule information which is similar to the schedule information for modifying, update the found similar schedule information with the schedule information for modifying when finding the similar schedule information stored in the schedule storage unit, and store the schedule information for modifying in the schedule storage unit when not finding the similar schedule information in the schedule storage unit.

2. The information processing device according to claim 1, wherein:

the keyword extraction unit is configured to partition the textual information into sequences of texts with using periods and/or commas, extract keywords from the sequences of the text through comparison with the multiple keywords stored in the keyword storage unit from the head of the each of the sequences of the text, and specify one keyword from context of the sequence of the text when a plurality of keywords are extracted at a same position.

3. The information processing device according to claim 1, wherein:

the keyword extraction unit is configured to specify sentences in the textual information each of which includes at least one keyword on the basis of the keywords stored in the keyword storage unit, delete sentences each of which does not include any keywords, and extract the keywords from the specified sentences;

the schedule information creation unit is configured to extract the schedule information based on the extracted keywords and category of the extracted keywords;

the keyword extraction unit is configured to re-extract the keywords from the sentences which include correct schedule information; and the schedule information creation unit is configured to create the schedule information based on the re-extracted keywords and category of the re-extracted keywords.

4. The information processing device according to claim 1, wherein:

the keyword extraction unit is configured to partition the textual information into sentences with periods, specifies sentences each of which includes at least one keyword on the basis of the keywords stored in the keyword storage unit and delete sentences which do not include any keywords, and extract the keywords from the specified sentences through comparison with the keywords stored in the keyword storage unit;

the schedule information creation unit is configured to extract the schedule information from the specified sentences based on the extracted keywords and the category of the extracted keywords;

the keyword extraction unit is configured to re-extract the keywords from the sentences which includes correct schedule information; and the schedule information creation unit is configured to create the schedule information based on the re-extracted keywords.

5. The information processing device according to claim 1, wherein the keywords include a combination of an arbitrary word and a specified word, and the keyword extraction unit is configured to extract the arbitrary word from the textual information when finding the text sequence matching with the keyword comprising the combination of an arbitrary word and a specified word.

6. The information processing device according to claim 1, wherein the keywords include a combination of first and second arbitrary words and a specified word, and the keyword extraction unit is configured to extract the first arbitrary word for the schedule information already stored in the schedule storage unit and the second arbitrary word as for the new schedule information from the textual information.

7. The information processing device according to claim 1, wherein the categories of the keywords include a category of topic, a category for request, and a category for ToDo list, and the schedule updating unit is configured to classify the created schedule information into the category for topic when the extracted keyword is classified to the category for topic, into the category for request when the extracted keyword is classified to the category for request, and into the category for ToDo list when the extracted keyword is classified to the category for ToDo list.

8. The information processing device according to claim 1, wherein the keywords include a pair of exclusive keywords;

the schedule updating unit is configured to classify the schedule information into a category corresponding to a predetermined one of the pair of exclusive keywords when the pair of exclusive keywords is extracted.

9. The information processing device according to claim 1, wherein the schedule updating unit is configured to set an unapplied flag to the schedule information which is not settled, and reset the unapplied flag for settled schedule information.

10. The information processing device according to claim 1, wherein the communication unit is configured to transmit advertisement information including date, advertisement content, and keywords, and the schedule information creation unit is configured to create the schedule information including the date and the advertisement content based on the extracted keywords extracted by the keyword extraction unit.

* * * * *